United States Patent
Borlick et al.

(10) Patent No.: US 12,244,603 B2
(45) Date of Patent: Mar. 4, 2025

(54) ENCRYPTION AND DECRYPTION OF DATA IN A CLOUD STORAGE BASED ON INDICATIONS IN METADATA

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Micah Robison, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/078,187

(22) Filed: Mar. 23, 2016

(65) Prior Publication Data
US 2017/0279812 A1    Sep. 28, 2017

(51) Int. Cl.
*H04L 9/40*    (2022.01)
*G06F 21/62*   (2013.01)

(52) U.S. Cl.
CPC ........ *H04L 63/107* (2013.01); *G06F 21/6218* (2013.01); *G06F 21/6236* (2013.01); *H04L 63/0428* (2013.01)

(58) Field of Classification Search
CPC ...... H04L 63/107; H04W 4/02; H04W 4/021; H04W 48/04; G06F 2221/2111
See application file for complete search history.

(56) References Cited

U.S. PATENT DOCUMENTS

| | | | |
|---|---|---|---|
| 7,836,509 B2 | 11/2010 | Yoo et al. | |
| 8,239,641 B2* | 8/2012 | Apacible | G06F 16/22 711/154 |
| 8,285,681 B2* | 10/2012 | Prahlad | H04L 67/1095 707/640 |
| 8,868,905 B2* | 10/2014 | Davis | H04L 63/107 713/160 |
| 8,898,291 B2* | 11/2014 | Boss | G06F 9/5011 709/224 |
| 8,918,862 B2* | 12/2014 | Bhattiprolu | G06F 21/78 726/19 |
| 8,990,950 B2* | 3/2015 | Kruger | G06F 12/00 726/26 |

(Continued)

OTHER PUBLICATIONS

U.S. Appl. No. 15/078,185, filed Mar. 23, 2016.

(Continued)

*Primary Examiner* — Zachary A. Davis
(74) *Attorney, Agent, or Firm* — KONRAD, RAYNES, DAVDA & VICTOR LLP; Rabindranath Dutta

(57) ABSTRACT

Provided are a method, a system, and a computer program product in which metadata associated with encrypted data is maintained in a cloud computing environment, where the metadata indicates whether reading of information in the encrypted data is restricted geographically. A controller provides a decryption code to a cloud server located in a geographical location. The decryption code is for decrypting the encrypted data. The controller provides the decryption code, based on a determination as to whether the metadata indicates whether the reading of information in the encrypted data is restricted geographically.

18 Claims, 10 Drawing Sheets

(56) References Cited

U.S. PATENT DOCUMENTS

| | | | |
|---|---|---|---|
| 9,154,513 B2* | 10/2015 | Nakayama | H04L 63/1408 |
| 9,268,789 B1* | 2/2016 | Swerdlow | G06F 16/1827 |
| 9,268,920 B1* | 2/2016 | Butler | G06F 21/10 |
| 9,342,329 B2* | 5/2016 | Shlomai | G06F 9/45537 |
| 9,348,652 B2* | 5/2016 | Raghu | G06F 9/45558 |
| 9,356,940 B2* | 5/2016 | Hanna, Jr. | H04L 63/08 |
| 9,531,533 B2* | 12/2016 | Ronca | H04L 9/0819 |
| 9,641,630 B2* | 5/2017 | Broussard | H04L 63/107 |
| 9,705,813 B2* | 7/2017 | Marshall | G06F 21/6218 |
| 9,952,889 B2* | 4/2018 | Cui | G06F 9/45558 |
| 9,955,308 B2* | 4/2018 | Baldwin | H04L 29/08657 |
| 10,148,756 B2* | 12/2018 | Gardner | H04L 45/121 |
| 10,237,115 B2* | 3/2019 | Yoon Lee | H04L 41/12 |
| 10,247,705 B2* | 4/2019 | Pellegrino | G01N 29/043 |
| 10,272,200 B2* | 4/2019 | Shapley | A61B 5/1118 |
| 10,503,912 B1* | 12/2019 | Kerr | G06Q 30/0643 |
| 10,601,917 B2* | 3/2020 | Chirammal | H04L 41/0806 |
| 10,749,773 B2* | 8/2020 | Hockett | H04L 43/08 |
| 10,949,555 B2* | 3/2021 | Rattan | G06F 21/602 |
| 2003/0002637 A1 | 1/2003 | Miyauchi et al. | |
| 2004/0133606 A1 | 7/2004 | Miloushev et al. | |
| 2007/0162716 A1 | 7/2007 | Yagisawa et al. | |
| 2010/0198889 A1 | 8/2010 | Byers et al. | |
| 2011/0225267 A1* | 9/2011 | Ohashi | H04L 63/0272 709/219 |
| 2013/0197401 A1 | 8/2013 | Sato et al. | |
| 2014/0074911 A1* | 3/2014 | Park | H04L 67/14 709/203 |
| 2014/0075493 A1* | 3/2014 | Krishnan | G06F 21/31 726/1 |
| 2014/0113604 A1* | 4/2014 | Kim | H04W 4/16 455/415 |
| 2014/0244309 A1* | 8/2014 | Francois | G06Q 10/10 705/3 |
| 2015/0213285 A1* | 7/2015 | Malko | G06F 21/6218 726/29 |
| 2016/0156671 A1* | 6/2016 | Cabrera | H04L 63/20 726/1 |
| 2016/0173502 A1* | 6/2016 | Statchuk | H04L 63/107 726/4 |
| 2016/0182529 A1* | 6/2016 | Biehl | H04L 63/107 726/1 |
| 2016/0245538 A1* | 8/2016 | Amer | F24F 11/62 |
| 2016/0352834 A1* | 12/2016 | Borowiec | G06F 3/067 |
| 2016/0357739 A1 | 12/2016 | Rathinagiri et al. | |
| 2017/0126698 A1* | 5/2017 | Minkovich | H04L 63/107 |
| 2017/0279890 A1 | 9/2017 | Borlick et al. | |

OTHER PUBLICATIONS

List of IBM Patents or Patent Applications Treated as Related dated Mar. 23, 2016, pp. 2.

Final Office Action dated Jun. 1, 2018, pp. 14, for U.S. Appl. No. 15/078,185, filed Mar. 23, 2016.

Response dated Sep. 4, 2018, pp. 11, to Final Office Action dated Jun. 1, 2018, pp. 14, for U.S. Appl. No. 15/078,185, filed Mar. 23, 2016.

Office Action dated Oct. 19, 2017, pp. 11, for U.S. Appl. No. 15/078,185, filed Mar. 23, 2016.

Response dated Jan. 19, 2018, pp. 9, to Office Action dated Oct. 9, 2017, pp. 20, for Office Action dated Oct. 19, 2017, pp. 11, for U.S. Appl. No. 15/078,185, filed Mar. 23, 2016.

Response dated Mar. 11, 2019, pp. 12, to Office Action dated Dec. 11, 2018, pp. 16, for U.S. Appl. No. 15/078,185.

Office Action dated Jun. 13, 2019, pp. 18, for U.S. Appl. No. 15/078,185.

Office Action dated Dec. 11, 2018, pp. 16, for U.S. Appl. No. 15/078,185.

Final Office Action dated Jan. 24, 2020, pp. 23, for U.S. Appl. No. 15/078,185.

Amendment dated Apr. 24, 2020, pp. 13, to Final Office Action dated Jan. 24, 2020, pp. 23, for U.S. Appl. No. 15/078,185.

Notice of Allowance dated Jul. 21, 2020, pp. 25, for U.S. Appl. No. 15/078,185.

* cited by examiner

ENCRYPTION AND DECRYPTION OF DATA IN A CLOUD STORAGE BASED ON INDICATIONS IN METADATA

BACKGROUND

1. Field

Embodiments relate to the encryption and decryption of data in cloud storage based on indications in metadata.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

SUMMARY OF THE PREFERRED EMBODIMENTS

Provided are a method, a system, and a computer program product in which metadata associated with encrypted data is maintained in a cloud computing environment, wherein the metadata indicates whether reading of information in the encrypted data is restricted geographically. A controller provides a decryption code to a cloud server located in a geographical location. The decryption code is for decrypting the encrypted data. The controller provides the decryption code, based on a determination as to whether the metadata indicates whether the reading of information in the encrypted data is restricted geographically.

In additional embodiments, in response to determining that the metadata indicates that the reading of information in the encrypted data is allowed in the geographical location where the cloud server is located, the decryption code is provided to the cloud server for decrypting the encrypted data.

In further embodiments, in response to determining that the metadata indicates that the reading of information in the encrypted data is not allowed in the geographical location where the cloud server is located, the providing of the decryption code to the cloud server for decrypting the encrypted data is avoided.

In certain embodiments, the encrypted data comprises data that is restricted by law or policies to be available for reading only in one or more selected geographical locations.

In further embodiments, the encrypted data comprises data is that is restricted by law or policies to be made unavailable for reading in one or more selected geographical locations.

In certain embodiments, in response to determining that the metadata indicates that the reading of information in the encrypted data is not allowed in the geographical location where the cloud server is located, the providing of the decryption code to the cloud server for decrypting the encrypted data is avoided.

In additional embodiments, the controller comprises at least two servers that provide redundancy, wherein the cloud computing environment comprises the controller and a heterogeneous cloud storage comprising a plurality of storage clouds that comprise a plurality of cloud servers. The plurality of storage clouds are located in a plurality of geographical locations.

Referring now to the drawings in which like reference numbers represent corresponding parts throughout:

DETAILED DESCRIPTION

In the following description, reference is made to the accompanying drawings which form a part hereof and which illustrate several embodiments. It is understood that other embodiments may be utilized and structural and operational changes may be made.

In certain situations, privacy and security of data have to be maintained to conform to corporate policies, customer preferences, and government policies, or for other reasons. For example, certain health related data of individuals may only be stored in the country in which the patient resides. Corporate policies may dictate that employee data be stored within the firewall of the corporation. There may be prohibitions on certain data crossing national boundaries. Additionally, there may be restrictions on who can access the data and such restrictions may dictate where the data is stored. If data is stored in cloud storage, such privacy and security of data have to be maintained. To maintain privacy and security of data, the data may be encrypted in cloud storage. It is of course possible that such encrypted data is copied in an unauthorized manner to other locations. In such situations, such unauthorized copies of encrypted data should be prevented from being read in such unauthorized locations.

In certain embodiments, metadata associated with data indicates that the storage of the data is to be restricted to selected geographies (e.g., locations/sites/countries). For example, Health Insurance Portability and Accountability Act (HIPAA) data may have to be restricted to be stored in the United States, and emails of users in the European Union (EU) may have to be stored in storage that is located in the EU. Once the metadata associated with the data indicates that the storage of the data is to be restricted geographically, the data is encrypted and the decryption codes are made available by the controller only to cloud servers located in geographies (e.g., locations/sites/countries) indicated in the metadata.

Exemplary Embodiments

Figure 1:
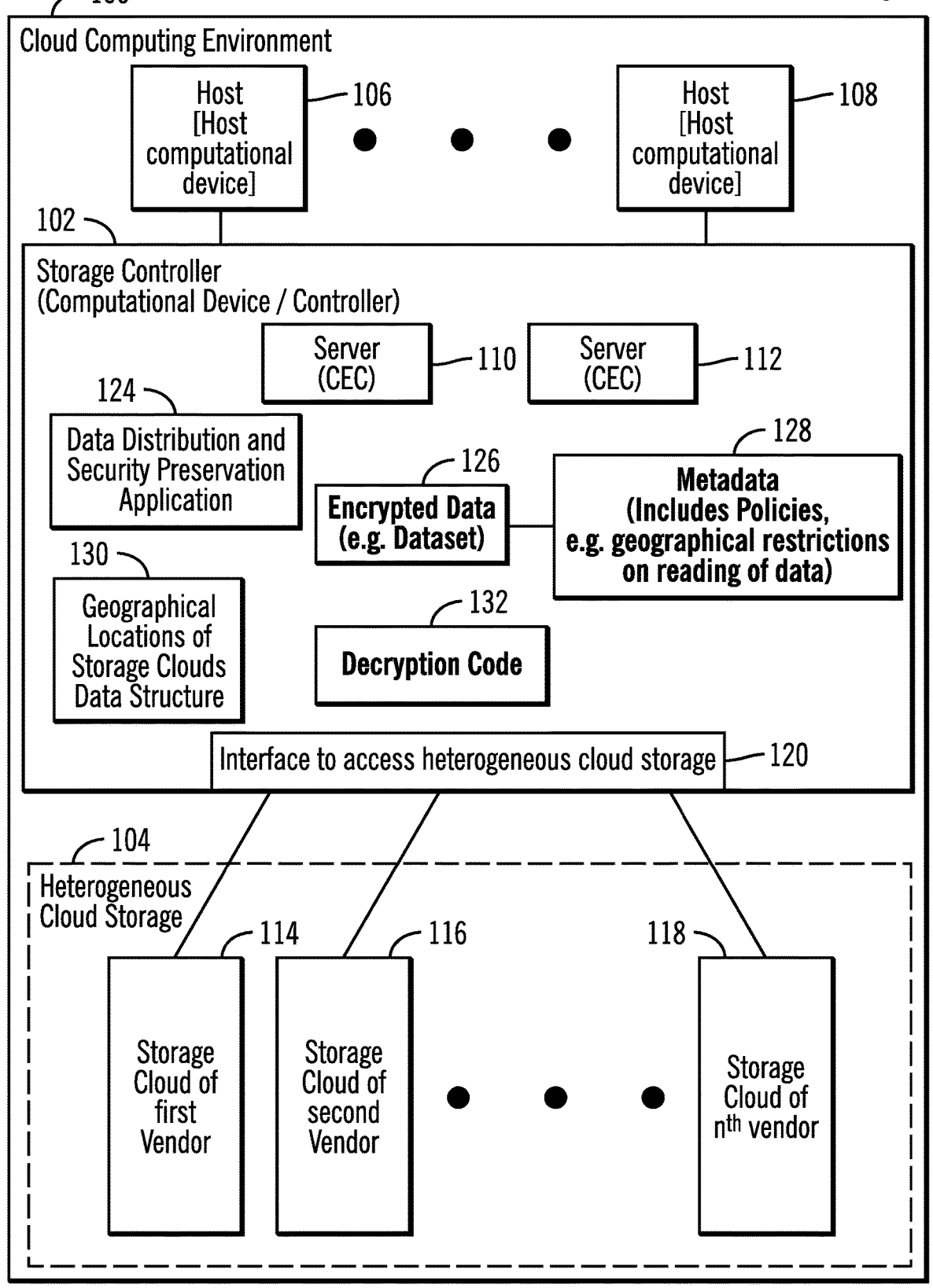
FIG. 1 illustrates a block diagram of a cloud computing environment comprising a storage controller coupled to a heterogeneous cloud storage comprising storage clouds distributed over a plurality of geographical locations, in accordance with certain embodiments.

FIG. 1 illustrates a block diagram of a cloud computing environment 100 comprising a storage controller 102 coupled to a heterogeneous cloud storage 104 comprising storage clouds distributed over a plurality of geographical locations, in accordance with certain embodiments. The storage controller 102 allows a plurality of hosts 106, 108 (e.g., host computational devices) to perform input/output (I/O) operations with logical storage maintained by the storage controller 102. The physical storage corresponding to the logical storage is found in the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, etc. The servers 110, 112 of the storage controller 102, the storage controller 102, and the hosts 106, 108 may comprise any suitable computational device including those presently known in the art, such as a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as a storage area network, a wide area network, the Internet, or an intranet. In certain embodiments, the servers 110, 112 may function redundantly and one server may be able to take over the operations of the other server. In certain embodiments, the servers 110, 112 of the storage controller 102, the storage controller 102, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity, and where each of the plurality of storage clouds may be maintained in different geographical locations. For example, a first vendor may provide the storage cloud 114, a second vendor may provide the storage cloud 116, and a third vendor may provide the storage cloud 118. The different storage clouds 114, 116, 118 may be placed at different geographical locations separated by a considerable distance, such as at least 10 kilometers, or for that matter in different countries or continents.

Each storage cloud 114, 116, 118 may be comprised of a plurality of storage devices, such as storage disks, tape drives, solid state storage, etc., that are maintained by a storage server (referred to as a cloud server) that has an operating system. In certain embodiments, the storage cloud 114 maintained by the first vendor may be in a first geographical location and may have one operating system, whereas the storage cloud 116 maintained by the second vendor may be in a second geographical location and may have another operating system.

The storage controller 102 may have an interface 120 to access the heterogeneous cloud storage 104. Additionally, a data distribution and security preservation application 124 that distributes and maintains security for encrypted data 126 in different storage clouds in the heterogeneous cloud storage 104 may execute in the storage controller 102. In certain embodiments, the encrypted data 126 comprises data that is restricted by law or policies to be available for reading only in one or more selected geographical locations. In certain other embodiments, the encrypted data 126 comprises data is that is restricted by law or policies to be made unavailable for reading in one or more selected geographical locations. The encrypted data 126 may be logically maintained in the storage controller 102 where the physical storage of the encrypted data 126 is in the heterogeneous cloud storage 104. The data distribution and security preservation application 124 may be implemented in software, firmware, or hardware, or any combination thereof, in accordance with certain embodiments.

The storage controller 102 may maintain metadata 128 associated with the encrypted data 126. The metadata 128 may include policies and geographical restrictions associated with the reading (and storage and other types of access) of the data in the heterogeneous cloud storage 104. The storage controller 102 may also maintain a data structure 130 that maintains the geographical locations of the storage clouds 114, 116, 118.

The data distribution and security preservation application 124 may use the data structure 130 that maintains the geographical locations of storage clouds 114, 116, 118 and the metadata 128 that includes policies and geographical restrictions associated with the storage and access of the encrypted data 126 to determine the storage cloud in which to physically store the encrypted data 126. Even if the encrypted data 126 is copied in an unauthorized manner to other locations, in certain embodiments the controller 102 declines to provide the decryption code 132 of the encrypted data by determining from the metadata 128 whether the storage cloud requesting the decryption code is authorized to access the information included in the encrypted data 126.

Figure 2:
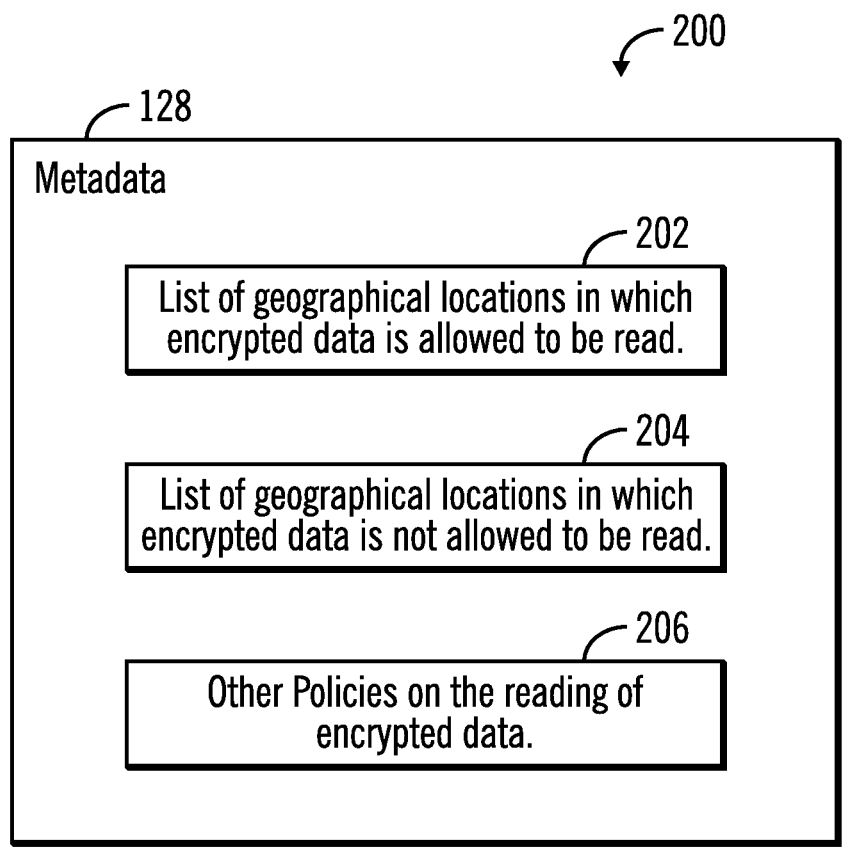
FIG. 2 illustrates a block diagram that shows metadata indicating permitted geographical locations for reading of encrypted data, in accordance with certain embodiments.

FIG. 2 illustrates a block diagram 200 that shows the metadata 128 indicating permitted geographical locations for the reading of the encrypted data, in accordance with certain embodiments. In certain embodiments, the metadata 128 associated with the encrypted data 126 may indicate a list of geographical locations in which the encrypted data 126 is allowed to be decrypted and read (shown via reference numeral 202). The metadata 128 may also indicate a list of geographical locations in which the encrypted data 126 is not allowed to be decrypted and read (shown via reference numeral 204). Other policies on data storage (shown via reference numeral 206) may also be stored in the metadata

128. For example, the other policies may indicate that that the encrypted data 126 may be stored or read in selected geographical locations only until a certain date, or for a particular period of time. The other policies may also indicate who has access to the encrypted data.

Figure 3:
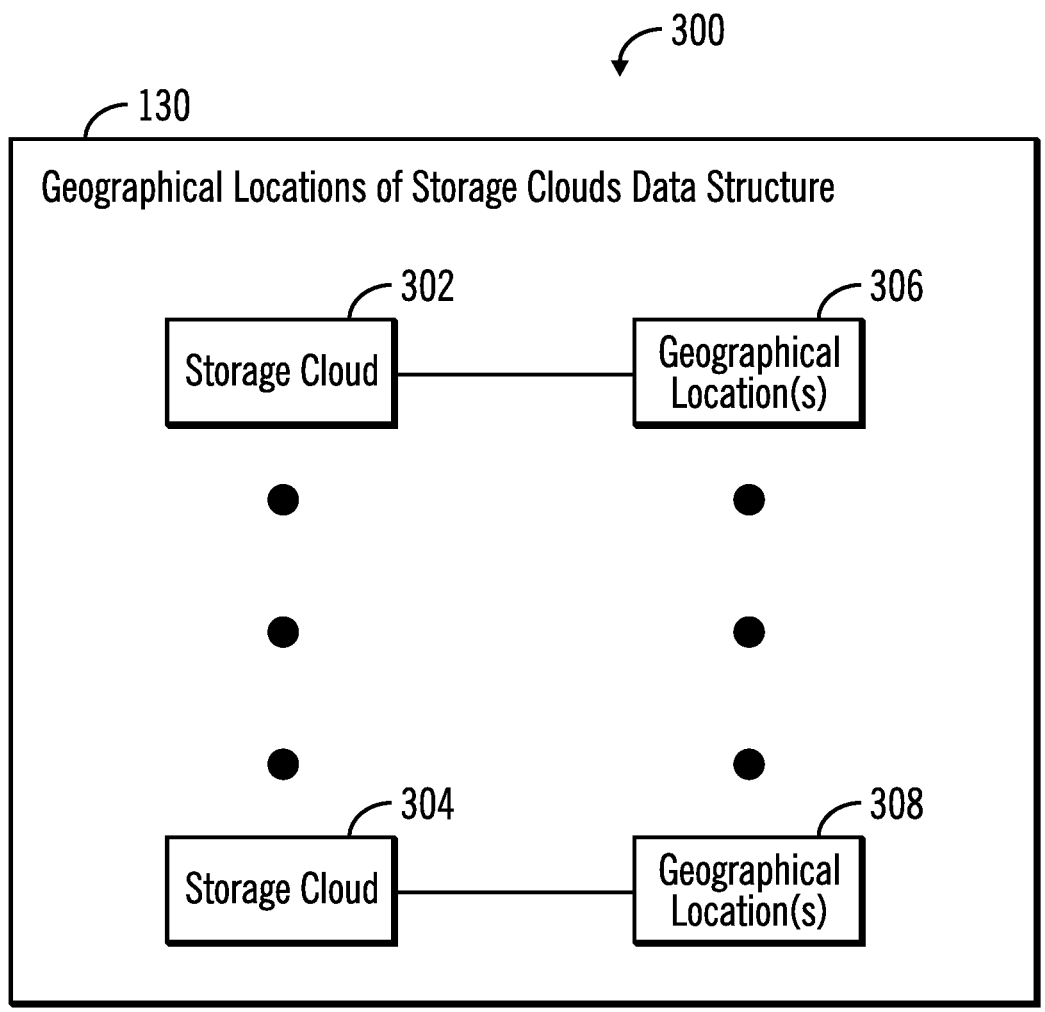
FIG. 3 illustrates a block diagram that shows storage clouds in a plurality of geographical locations, in accordance with certain embodiments.

FIG. 3 illustrates a block diagram 300 that shows storage clouds in a plurality of geographical locations, in accordance with certain embodiments. For example, in certain embodiments, the "geographical locations of storage clouds data structure" 130 that is maintained in the storage controller 102 may indicate that the storage cloud 302 is located in geographical location 306 (e.g., Germany), and that the storage cloud 304 is located in geographical location 308 (e.g., United States of America). The storage clouds 302, 304 may correspond to the storage clouds 114, 116, 118 shown in FIG. 1.

Figure 4:
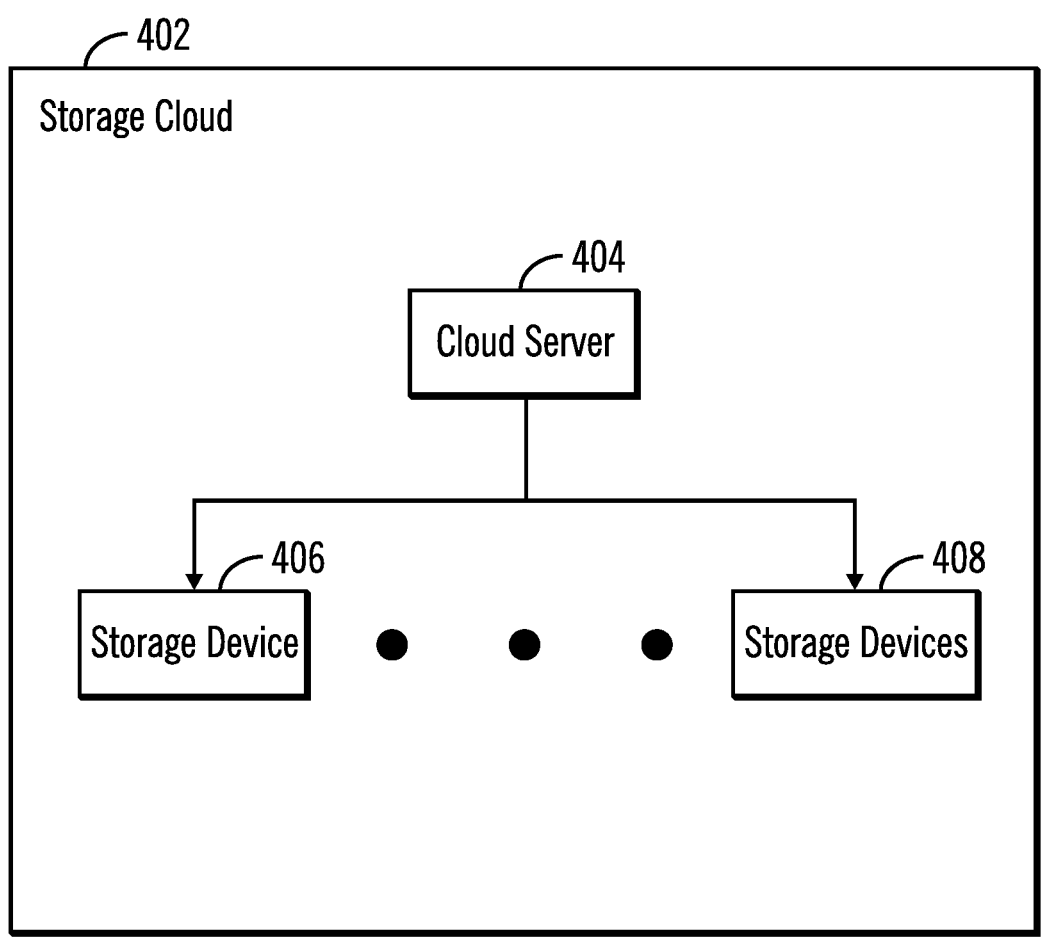
FIG. 4 illustrates a block diagram that shows a storage cloud comprised of a cloud server and a plurality of storage devices coupled to the cloud server, in accordance with certain embodiments.

FIG. 4 illustrates a block diagram that shows a storage cloud 402 comprised of a cloud server 404 and a plurality of storage devices 406, 408 coupled to the cloud server 404, in accordance with certain embodiments. The cloud server 404 may comprise any suitable computational device including those presently known in the art, such as a personal computer, a workstation, a server, a mainframe, a hand held computer, a palm top computer, a telephony device, a network appliance, a blade computer, a processing device, etc. The storage devices 406, 408 may comprise any suitable storage device comprising a disk drive, a tape drive, an optical drive, a solid state drive, etc. The storage cloud 402 may correspond to any of the storage clouds 114, 116, 118 shown in FIG. 1.

Figure 5:
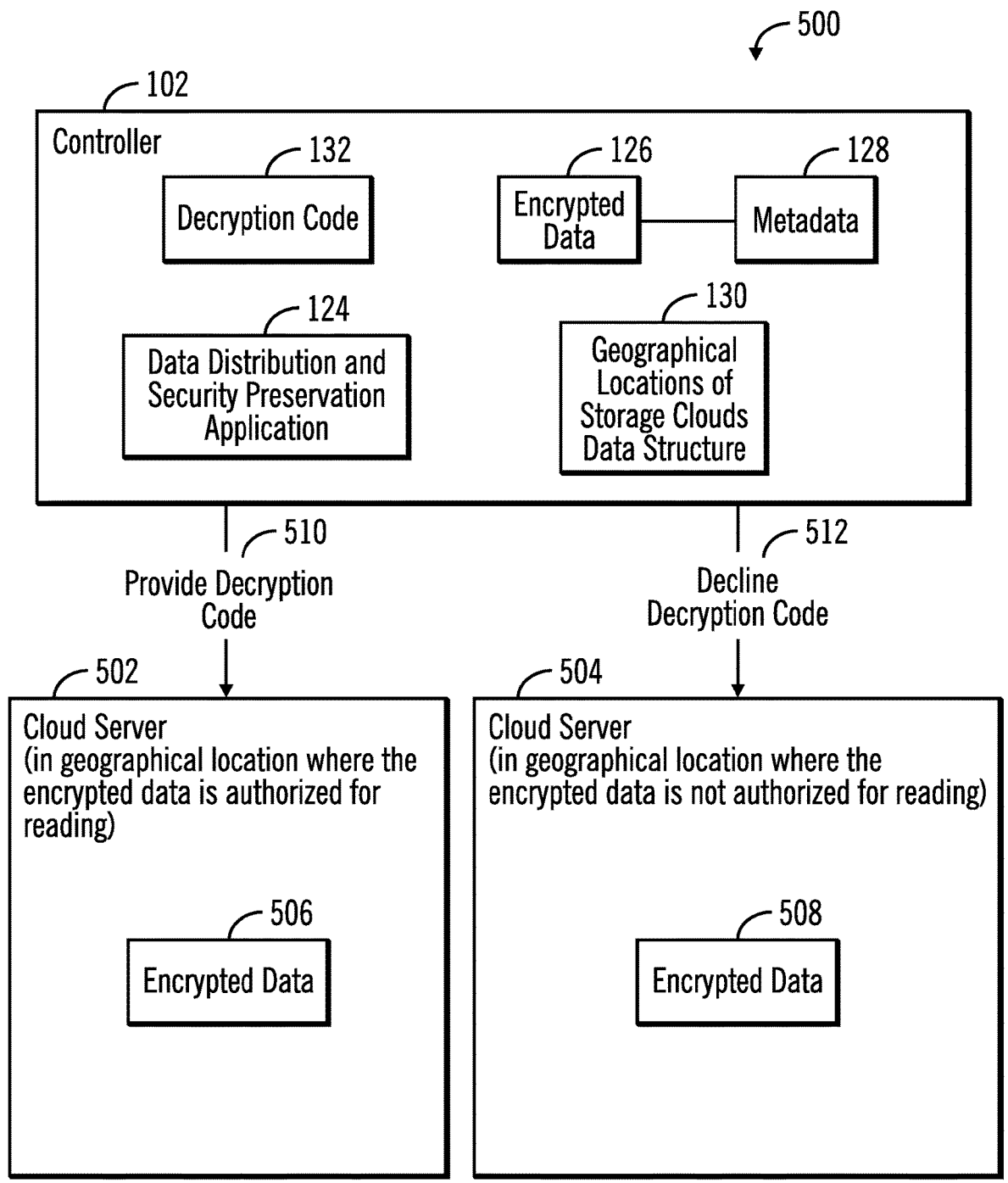
FIG. 5 illustrates a block diagram that shows a controller providing or declining decryption code for encrypted data to cloud servers, based on policies regarding geographically constrained reading ability provided in the metadata for the encrypted data, in accordance with certain embodiments.

FIG. 5 illustrates a block diagram 500 that shows a controller 102 providing or declining decryption code for encrypted data to cloud servers 502, 504, based on policies regarding geographically constrained reading ability provided in the metadata 128 for the encrypted data 126, in accordance with certain embodiments.

The cloud server 502 is located in a geographical location where the encrypted data 506 (which is a physical copy of the encrypted data 126) is authorized for reading after decryption. The cloud server 504 is located in a geographical location where the encrypted data 508 (which is a physical copy of the encrypted data 126) is not authorized for decryption.

In certain embodiments, in response to a request from the cloud server 502 for the decryption code 132 for the encrypted data 506, the data distribution and security preservation application 124 determines the geographical location of the cloud server 502 from the "geographical locations of storage clouds data structure" 130, and based on the entries in the metadata 128 determines whether the cloud server 502 is entitled to the decryption code 132. If the metadata 128 indicates that the geographical location of the cloud server 502 is a permitted location for reading of the encrypted data 506, then the controller 102 provides the decryption code 132 (shown via reference numeral 510) to the cloud server 502.

In certain embodiments, in response to a request from the cloud server 504 for the decryption code 132 for the encrypted data 508, the data distribution and security preservation application 124 determines the geographical location of the cloud server 504 from the "geographical locations of storage clouds data structure" 130, and based on the entries in the metadata 128 determines whether the cloud server 504 is entitled to the decryption code 132. If the metadata 128 indicates that the geographical location of the cloud server 504 is not a permitted location for reading of the encrypted data 508, then the controller 102 declines to provide the decryption code 132 (shown via reference numeral 512) to the cloud server 504.

Figure 6:
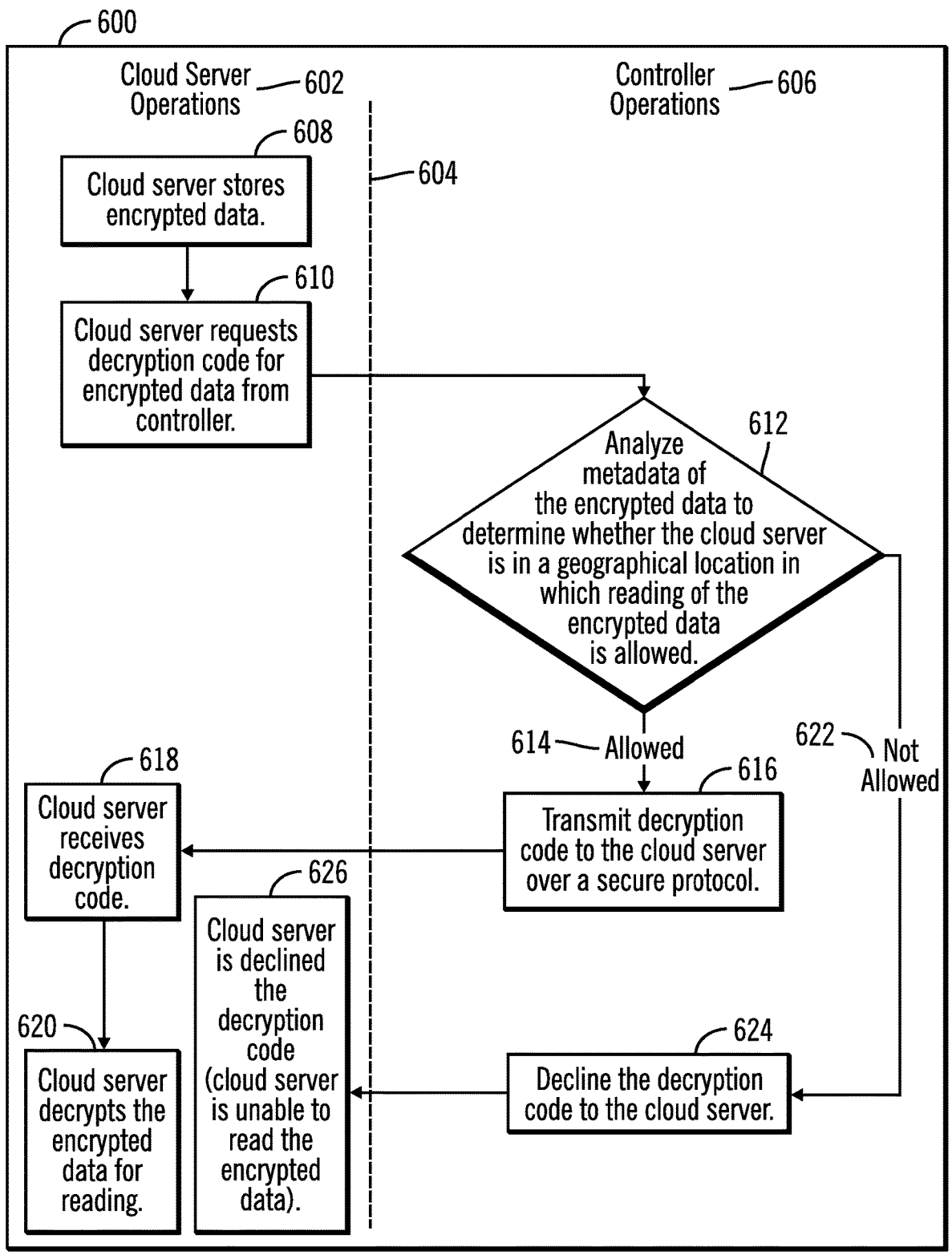
FIG. 6 illustrates a first flowchart that shows operations performed by a controller and a cloud server for decrypting encrypted data based on policies regarding geographically constrained reading ability provided in the metadata for the encrypted data, in accordance with certain embodiments.

FIG. 6 illustrates a first flowchart 600 that shows operations performed by a controller 102 and a cloud server (e.g., cloud server 502, 504) for decrypting encrypted data based on policies regarding geographically constrained reading ability provided in the metadata 128 for the encrypted data, in accordance with certain embodiments. The operations performed by the cloud server (shown via reference numeral 602) are shown to the left of the dashed vertical line 604, and the operations performed by the controller 102 (shown via reference numeral 606) are shown to the right of the dashed vertical line 604.

Control starts at block 608 in which the cloud server stores encrypted data. Control proceeds to block 610 in which the cloud server requests the decryption code for the encrypted data from the controller 102. The controller 102 receives the request and then analyses the metadata of the encrypted data to determine whether the cloud server is in a geographical location in which the reading of the encrypted data is allowed (at block 612).

If the reading of the encrypted data is allowed (branch 614 from block 612) control proceeds to block 616 in which the controller 102 transmits the decryption code to the cloud server over a secure communication protocol. The cloud server receives (at block 618) the decryption code, and then decrypts (at block 620) the encrypted data by using the received decryption code. On decrypting the encrypted data, the cloud server is able to read the information included in the encrypted data.

If the reading of the encrypted data is not allowed (branch 622 from block 612) control proceeds to block 624 in which the controller 102 declines the decryption code to the cloud server. The cloud server receives (at block 626) the notification that the decryption code has been declined. The cloud server is unable to read the encrypted data.

Figure 7:
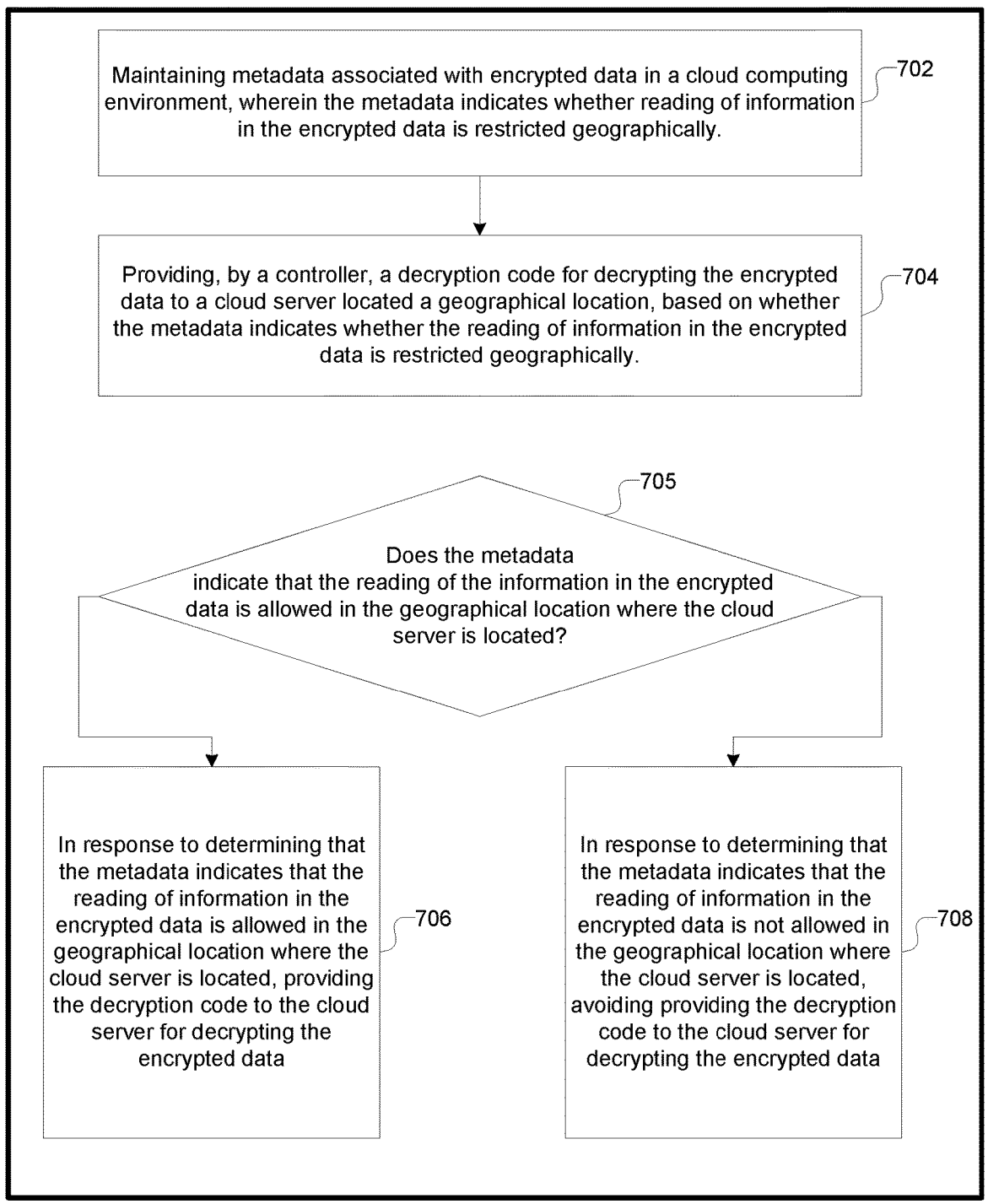
FIG. 7 illustrates flowcharts that show operations performed by a controller for providing decryption code for encrypted data based on policies regarding geographically constrained reading ability provided in the metadata for the encrypted data, in accordance with certain embodiments.

FIG. 7 illustrates flowcharts 700 that show operations performed by a controller 102 for providing decryption code for encrypted data based on policies regarding geographically constrained reading ability provided in the metadata for the encrypted data, in accordance with certain embodiments. The operations shown in FIG. 7 may be performed by the data distribution and security preservation application 124 that executes in the storage controller 102.

Control starts at block 702 in which metadata 128 associated with encrypted data 126 is maintained in a cloud computing environment 100, wherein the metadata 128 indicates whether reading of information in the encrypted data is restricted geographically. A controller 102 provides (at block 704) a decryption code 132 for decrypting the encrypted data to a cloud server located in a geographical location, based on whether the metadata 128 indicates whether the reading of information in the encrypted data is restricted geographically.

The providing or not providing of the metadata may be performed by operations shown in blocks 705, 706, 708. At blocks 705, 706, in response to determining that the metadata 128 indicates that the reading of information in the encrypted data is allowed in the geographical location where the cloud server is located, the decryption code is provided to the cloud server for decrypting the encrypted data. At blocks 705, 708, in response to determining that the metadata indicates that the reading of information in the encrypted data is not allowed in the geographical location where the cloud server is located, the controller 102 avoids providing the decryption code to the cloud server for decrypting the encrypted data.

Therefore, FIGS. 1-7 illustrate certain embodiments in which metadata associated with encrypted data indicates whether the decryption code should be made available to cloud servers located in different geographies. If a cloud server is located in a geographical location where the encrypted data is allowed to be decrypted and read, then the controller provides the decryption code to the cloud server. If a cloud server is located in a geographical location where the encrypted data is not allowed to be decrypted and read, then the controller declines to provide the decryption code to the cloud server.

Further Cloud Computing Environments

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
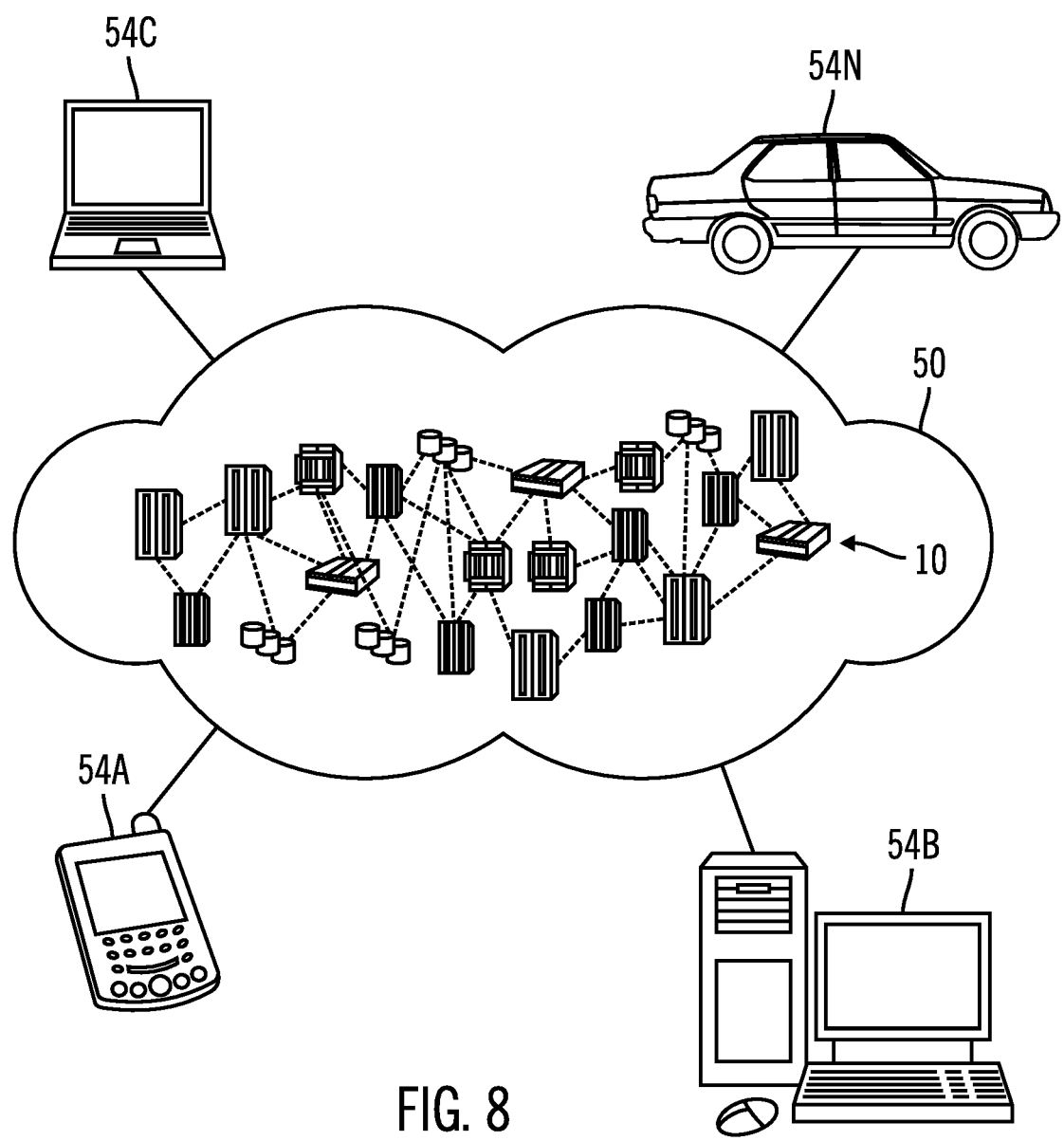
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 9:
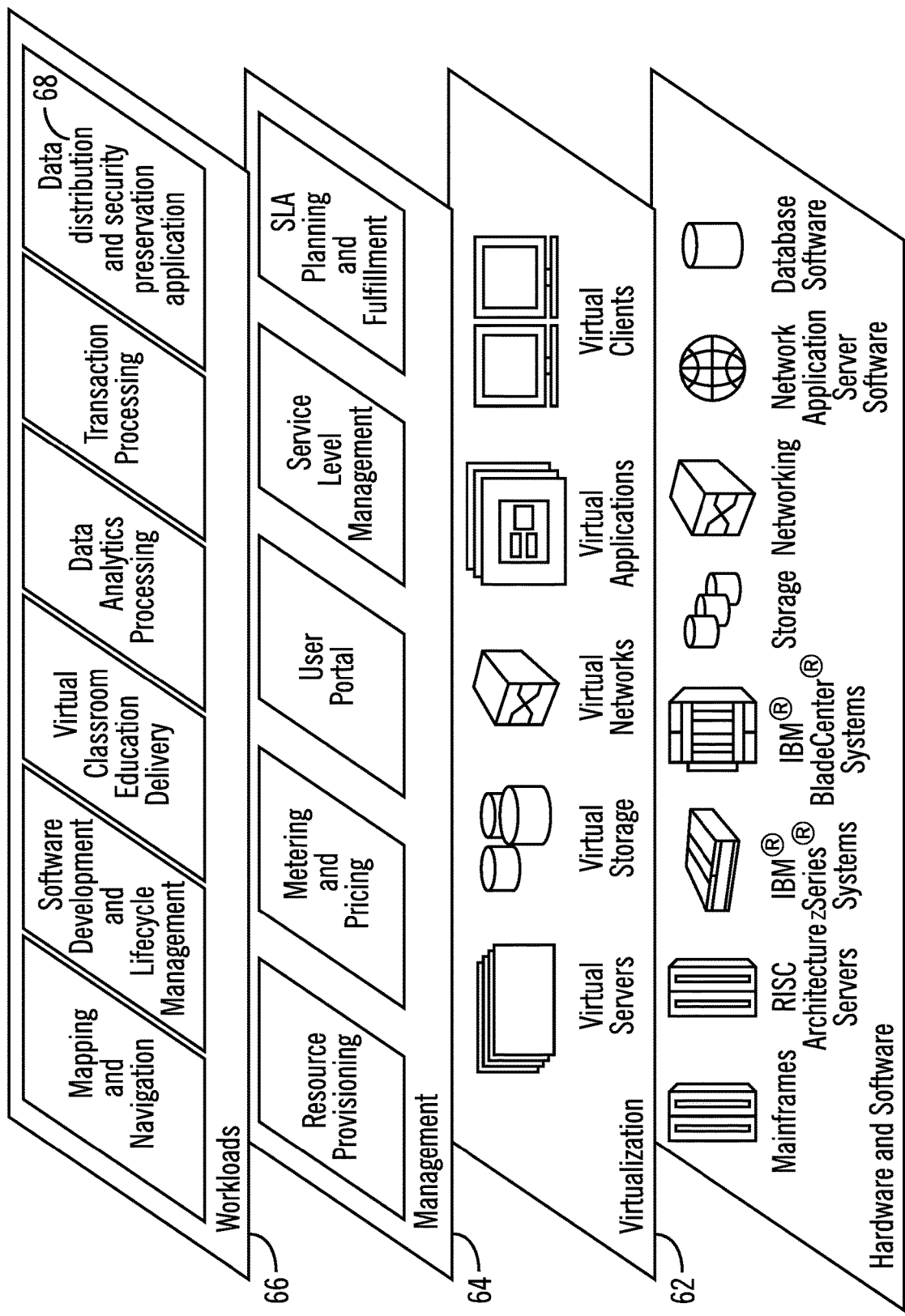
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components (Reference numeral 60 shows IBM ZSERIES* systems, IBM XSERIES* systems, and IBM PSERIES* systems as IBM® Series® Systems). Examples of software components include network application server software, in one example IBM WEBSPHERE* application server software; and database software, in one example IBM DB2* database software.
* IBM, ZSERIES, PSERIES, XSERIES, BLADECENTER, WEBS PHERE, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the data distribution and security preservation application 124 (shown via reference numeral 68 in FIG. 9) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
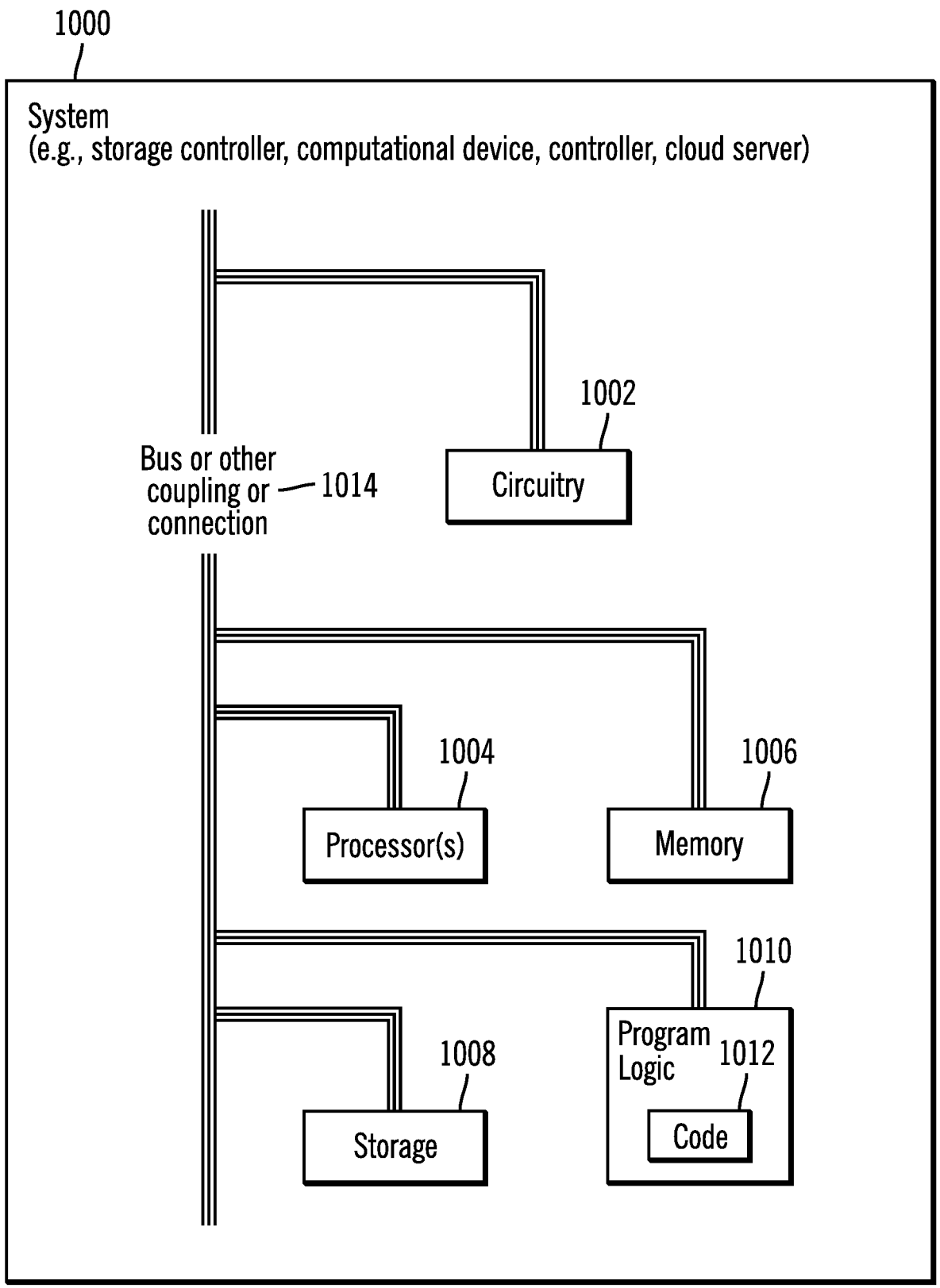
FIG. 10 illustrates a block diagram of a computational system that shows certain elements that may be included in the storage controller including servers shown in FIG. 1, in accordance with certain embodiments.

FIG. 10 illustrates a block diagram that shows certain elements that may be included in the storage controller 102, the servers 110, 112, the hosts 106, 108 or other computational devices such as those in storage clouds 114, 116, 118, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

storing encrypted data in a first cloud server of a plurality of cloud servers in a cloud computing environment;

configuring a controller having at least a first processor complex and a second processor complex that function redundantly of each other, wherein the first processor complex is able to take over operations performed by the second processor complex, wherein the controller includes a data distribution and security preservation application and a data structure that stores information on where a plurality of storage clouds are maintained, and wherein the plurality of storage clouds include the plurality of cloud servers;

maintaining metadata associated with the encrypted data in the controller in the cloud computing environment, wherein the controller is communicatively coupled via an interface to the first cloud server of the plurality of cloud servers, wherein the metadata indicates geographical restrictions and policies on the encrypted data, wherein the geographical restrictions and the policies indicate that the encrypted data is allowed to be stored in a first geographical location only until a predetermined date, wherein the first cloud server of the plurality of cloud servers is located in a second geographical location and is maintained by a first vendor and has a first operating system, wherein a second cloud server of the plurality of cloud servers is located in a third geographical location and is maintained by a second vendor and has a second operating system, wherein the second operating system is different from the first operating system, and wherein the geographical restrictions include first restrictions that require storing health related data of an individual in a country in which the individual resides, second restrictions that require storing employee data of a corporation within a firewall of the corporation, and third restrictions that require storing electronic mail data of residents of a group of countries in storage that is located in the group of countries;

sending a request from the first cloud server to the controller for a decryption code for the encrypted data;

in response to receiving, by the controller, the request from the first cloud server, determining by the data distribution and security preservation application and the data structure included in the controller from the metadata whether the metadata indicates that reading of information in the encrypted data is allowed in the second geographical location where the first cloud server that stores the encrypted data is located;

in response to determining, by the data distribution and security preservation application and the data structure included in the controller, that the metadata indicates that the reading of information in the encrypted data is allowed in the second geographical location where the first cloud server that stores the encrypted data is located, transmitting the decryption code from the controller to the first cloud server, wherein on receiving the decryption code the first cloud server decrypts the encrypted data; and in response to determining, by the data distribution and security preservation application and the data structure included in the controller, that the metadata indicates that the reading of information in the encrypted data is not allowed in the second geographical location where the first cloud server that stores the encrypted data is located, declining to provide the decryption code to the first cloud server, wherein in response to the encrypted data being copied in an unauthorized manner to a third cloud server of the plurality of cloud servers the controller declines to provide the decryption code to the third cloud server, and wherein the controller allows a plurality of host computational devices to perform Input/Output (I/O) operations with logical storage maintained in the controller, wherein physical storage corresponding to the logical storage is maintained in the plurality of cloud servers.

2. The method of claim 1, wherein the encrypted data comprises data that is restricted by law or policies to be available for reading only in one or more selected geographical locations.

3. The method of claim 2, wherein the controller is a storage controller, wherein the encrypted data is logically maintained in the storage controller, and wherein the physical storage of the encrypted data is in one or more of the plurality of cloud servers.

4. The method of claim 3, wherein the data structure is a geographical location of storage clouds data structure maintained in the storage controller, wherein the country in which the individual resides is a first country, wherein the geographical location of storage clouds data structure indicates that a first storage cloud of the plurality of storage clouds is located in a second country and a second storage cloud of the plurality of storage clouds is located in a third country that is different from the second country.

5. The method of claim 4, wherein the data distribution and security preservation application executes in a workloads layer of the cloud computing environment that also comprises a hardware and software layer, a virtualization layer, and a management layer.

6. The method of claim 1, wherein the encrypted data comprises data is that is restricted by law or policies to be made unavailable for reading in one or more selected geographical locations.

7. A system, comprising:
a memory; and
a processor coupled to the memory, wherein the processor is configured to perform operations, the operations comprising:
storing encrypted data in a first cloud server of a plurality of cloud servers in a cloud computing environment;
configuring a controller having at least a first processor complex and a second processor complex that function redundantly of each other, wherein the first processor complex is able to take over operations performed by the second processor complex, wherein the controller includes a data distribution and security preservation application and a data structure that stores information on where a plurality of storage clouds are maintained, and wherein the plurality of storage clouds include the plurality of cloud servers;
maintaining metadata associated with the encrypted data in the controller in the cloud computing environment, wherein the controller is communicatively coupled via an interface to the first cloud server of the plurality of cloud servers, wherein the metadata indicates geographical restrictions and policies on the encrypted data, wherein the geographical restrictions and the policies indicate that the encrypted data is allowed to be stored in a first geographical location only until a predetermined date, wherein the first cloud server of the plurality of cloud servers is located in a second geographical location and is maintained by a first vendor and has a first operating system, wherein a second cloud server of the plurality of cloud servers is located in a third geographical location and is maintained by a second vendor and has a second operating system, wherein the second operating system is different from the first operating system, and wherein the geographical restrictions include first restrictions that require storing health related data of an individual in a country in which the individual resides, second restrictions that require storing employee data of a corporation within a firewall of the corporation, and third restrictions that require storing electronic mail data of residents of a group of countries in storage that is located in the group of countries;
sending a request from the first cloud server to the controller for a decryption code for the encrypted data;
in response to receiving, by the controller, the request from the first cloud server, determining by the data distribution and security preservation application and the data structure included in the controller from the metadata whether the metadata indicates that reading of information in the encrypted data is allowed in the second geographical location where the first cloud server that stores the encrypted data is located;
in response to determining, by the data distribution and security preservation application and the data structure included in the controller, that the metadata indicates that the reading of information in the encrypted data is allowed in the second geographical location where the first cloud server that stores the encrypted data is located, transmitting the decryption code from the controller to the first cloud server, wherein on receiving the decryption code the first cloud server decrypts the encrypted data; and
in response to determining, by the data distribution and security preservation application and the data structure included in the controller, that the metadata indicates that the reading of information in the encrypted data is not allowed in the second geographical location where the first cloud server that stores the encrypted data is located, declining to provide the decryption code to the first cloud server, wherein in response to the encrypted data being copied in an unauthorized manner to a third cloud server of the plurality of cloud servers the controller declines to provide the decryption code to the third cloud server, the operations further comprising: allowing a plurality of host computational devices to perform Input/Output (I/O) operations with logical storage maintained in the controller, wherein physical storage corresponding to the logical storage is maintained in the plurality of cloud servers.

8. The system of claim 7, wherein the encrypted data comprises data that is restricted by law or policies to be available for reading only in one or more selected geographical locations.

9. The system of claim 8, wherein the controller is a storage controller, wherein the encrypted data is logically maintained in the storage controller, and wherein the physical storage of the encrypted data is in one or more of the plurality of cloud servers.

10. The system of claim 9, wherein the data structure is a geographical location of storage clouds data structure maintained in the storage controller, wherein the country in which the individual resides is a first country, wherein the geographical location of storage clouds data structure indicates that a first storage cloud of the plurality of storage clouds is located in a second country and a second storage cloud of the plurality of storage clouds is located in a third country that is different from the second country.

11. The system of claim 10, wherein the data distribution and security preservation application executes in a workloads layer of the cloud computing environment that also comprises a hardware and software layer, a virtualization layer, and a management layer.

12. The system of claim 7, wherein the encrypted data comprises data is that is restricted by law or policies to be made unavailable for reading in one or more selected geographical locations.

13. A computer program product, the computer program product comprising a computer readable storage medium having computer readable program code embodied therewith, the computer readable program code configured to perform operations in a controller, the operations comprising:

storing encrypted data in a first cloud server of a plurality of cloud servers in a cloud computing environment;

configuring the controller, wherein the controller has at least a first processor complex and a second processor complex that function redundantly of each other, wherein the first processor complex is able to take over operations performed by the second processor complex, wherein the controller includes a data distribution and security preservation application and a data structure that stores information on where a plurality of storage clouds are maintained, and wherein the plurality of storage clouds include the plurality of cloud servers;

maintaining metadata associated with the encrypted data in the controller in the cloud computing environment, wherein the controller is communicatively coupled via an interface to the first cloud server of the plurality of cloud servers, wherein the metadata indicates geographical restrictions and policies on the encrypted data, wherein the geographical restrictions and the policies indicate that the encrypted data is allowed to be stored in a first geographical location only until a predetermined date, wherein the first cloud server of the plurality of cloud servers is located in a second geographical location and is maintained by a first vendor and has a first operating system, wherein a second cloud server of the plurality of cloud servers is located in a third geographical location and is maintained by a second vendor and has a second operating system, wherein the second operating system is different from the first operating system, and wherein the geographical restrictions include first restrictions that require storing health related data of an individual in a country in which the individual resides, second restrictions that require storing employee data of a corporation within a firewall of the corporation, and third restrictions that require storing electronic mail data of residents of a group of countries in storage that is located in the group of countries;

sending a request from the first cloud server to the controller for a decryption code for the encrypted data;

in response to receiving, by the controller, the request from the first cloud server, determining by the data distribution and security preservation application and the data structure included in the controller from the metadata whether the metadata indicates that reading of information in the encrypted data is allowed in the second geographical location where the first cloud server that stores the encrypted data is located;

in response to determining, by the data distribution and security preservation application and the data structure included in the controller, that the metadata indicates that the reading of information in the encrypted data is allowed in the second geographical location where the first cloud server that stores the encrypted data is located, transmitting the decryption code from the controller to the first cloud server, wherein on receiving the decryption code the first cloud server decrypts the encrypted data; and in response to determining, by the data distribution and security preservation application and the data structure included in the controller, that the metadata indicates that the reading of information in the encrypted data is not allowed in the second geographical location where the first cloud server that stores the encrypted data is located, declining to provide the decryption code to the first cloud server, wherein in response to the encrypted data being copied in an unauthorized manner to a third cloud server of the plurality of cloud servers the controller declines to provide the decryption code to the third cloud server, the operations further comprising: allowing a plurality of host computational devices to perform Input/Output (I/O) operations with logical storage maintained in the controller, wherein physical storage corresponding to the logical storage is maintained in the plurality of cloud servers.

14. The computer program product of claim 13, wherein the encrypted data comprises data that is restricted by law or policies to be available for reading only in one or more selected geographical locations.

15. The computer program product of claim 14, wherein the controller is a storage controller, wherein the encrypted data is logically maintained in the storage controller, and wherein the physical storage of the encrypted data is in one or more of the plurality of cloud servers.

16. The computer program product of claim 15, wherein the data structure is a geographical location of storage clouds data structure maintained in the storage controller, wherein the country in which the individual resides is a first country, wherein the geographical location of storage clouds data structure indicates that a first storage cloud of the plurality of storage clouds is located in a second country and a second storage cloud of the plurality of storage clouds is located in a third country that is different from the second country.

17. The computer program product of claim 16, wherein the data distribution and security preservation application executes in a workloads layer of the cloud computing environment that also comprises a hardware and software layer, a virtualization layer, and a management layer.

18. The computer program product of claim 13, wherein the encrypted data comprises data is that is restricted by law or policies to be made unavailable for reading in one or more selected geographical locations.

\* \* \* \* \*